Aug. 5, 1924.
J. A. MILLIKEN
METHOD OF PRODUCING GLASSWARE
Filed April 8, 1921
1,503,962
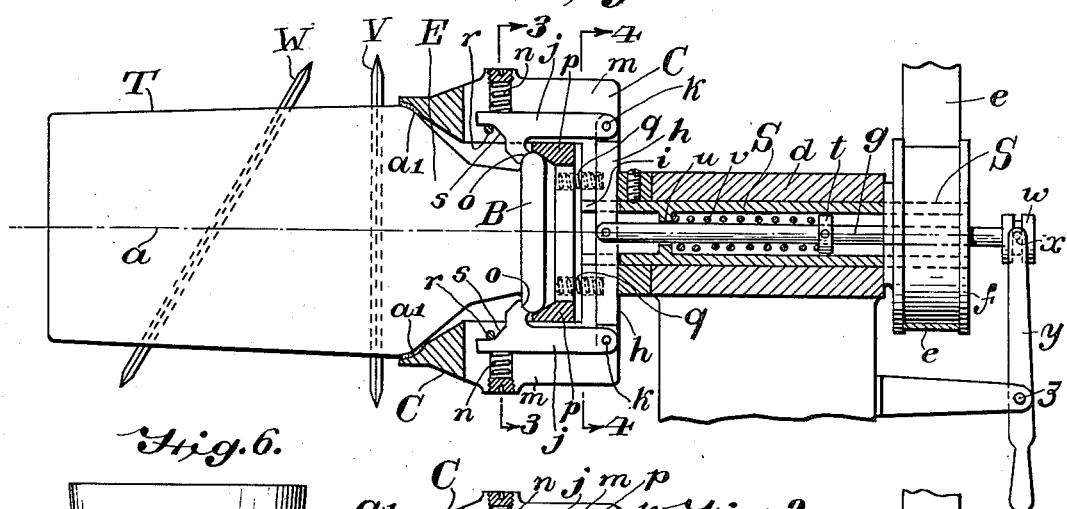
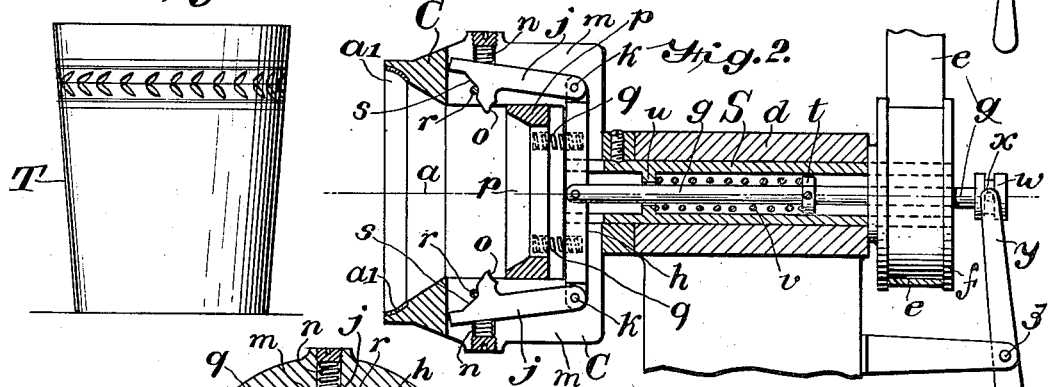
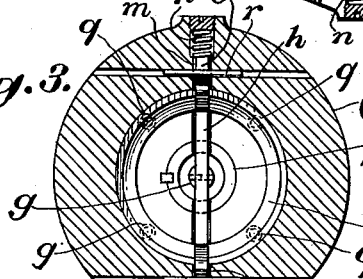
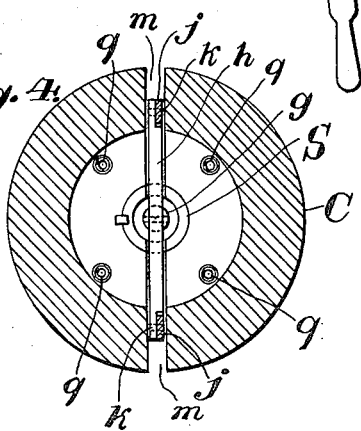
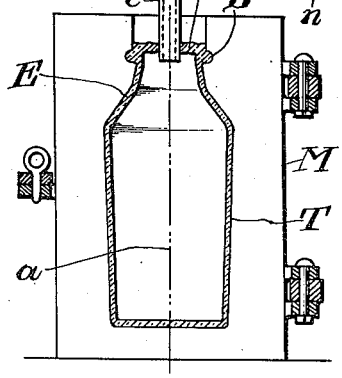
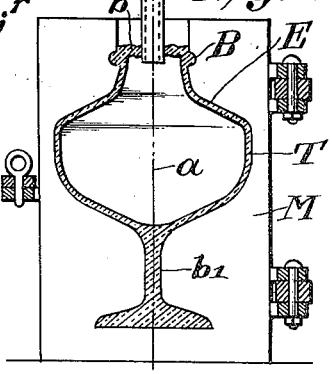
INVENTOR.
John A. Milliken
BY Cornelius D. Ehret
his ATTORNEY.

Patented Aug. 5, 1924.

1,503,962

UNITED STATES PATENT OFFICE.

JOHN A. MILLIKEN, OF BAYONNE, NEW JERSEY, ASSIGNOR TO JOHN E. MARSDEN, OF EGG HARBOR CITY, NEW JERSEY.

METHOD OF PRODUCING GLASSWARE.

Application filed April 8, 1921. Serial No. 459,651.

*To all whom it may concern:*

Be it known that I, JOHN A. MILLIKEN, a citizen of the United States, residing in Bayonne, county of Hudson, State of New Jersey, have invented certain new and useful Improvements in Methods of Producing Glassware, of which the following is a specification.

My invention relates to a method of producing glassware in general, and more particularly drinking glasses, tumblers and analogous or other articles; and my invention relates more particularly to production of such glassware and the ornamentation thereof, as by cutting or grinding.

In accordance with my invention, the article is formed of glass, as by blowing or forming in a mold, or otherwise, with an integral extension or projection by which it is held and rotated while the article itself is severed from the extension or projection, or is first ground or otherwise ornamented or operated upon and then severed from the extension.

My invention resides in the method of the character hereinafter described and claimed.

For an understanding of my method, reference is to be had to the accompanying drawing, in which:

Fig. 1 shows an article with integral extension held and rotated by the latter, the holding and rotating structure being shown in longitudinal section, some parts in elevation.

Fig. 2 is a view of the holding and rotating structure of Fig. 1 in position for receiving a piece to be operated upon.

Fig. 3 is a cross sectional view on the line 3—3 of Fig. 1.

Fig. 4 is a cross sectional view on the line 4—4 of Fig. 1.

Fig. 5 is an elevational view, partly in section, showing an article and its neck or extension within a mold.

Fig. 6 is an elevational view of a finished article produced by my method.

Fig. 7 is an elevational view, partly in section, of a piece of stem ware within a mold.

The article, as a tumbler T, is formed of glass in any suitable way, as by blowing the same within a mold a portion M of which is shown in Fig. 5. There is blown or formed integral therewith the extension or neck E, which preferably terminates in a bead, ridge or rib B. The external surface of the extension, as of the neck E as well as of the bead B, is concentric with the article T itself; that is, the outer surfaces of the article T as well as of its extension or bead B are concentric with respect to the axis $a$.

While I have shown a neck with a bead, it will be understood that the extension may be of any suitable form or structure, the desideratum being that at one or more portions thereof, whereby it may be held in a chuck or the like, its surface or surfaces are concentric with the axis of the article itself, whereby the article itself may be held true in a chuck or other holder, whereby the article when rotated will run true and will not wobble.

The excess glass is indicated at $b$ adhering during the blowing operation to the blowpipe $c$.

Referring to Figs. 1 to 4 inclusive, C is a chuck body driven by the hollow shaft S supported by the bearing $d$ and rotated by any suitable means, as for example, the belt $e$, which drives the pulley $f$ secured to the shaft S. Extending through the hollow shaft S is the shaft or rod $g$ attached at its end to the bar $h$, which extends through the slot $i$ in the shaft S. Fingers $j$ are pivoted to the bar $h$ at $k$, and are disposed in slots $m$ in the chuck body C. The ends of the fingers $j$ are urged toward the axis of the chuck by springs $n$, thereby forcing the lugs $o$ into engagement with the bead B, which is engaged on its opposite side by the longitudinally yielding member $p$, disposed in the bore of the member C and thrust against the bead B by springs $q$. Extending across the slots $m$ in the member C are the pins $r$, with which co-act the cams or inclined surfaces $s$ on the fingers $j$. Upon the shaft $g$ is a collar $t$, between which and the abutment $u$ is confined the helical spring $v$ within the shaft S. At its outer end the shaft $g$ has secured thereto the slotted collar $w$, into which extends a pin $x$ carried by the lever $y$ pivoted at $z$.

By thrusting the shaft $g$ toward the left, as indicated in Fig. 2, in opposition to spring $v$ by lever $y$, the bar $h$ moves the fingers $j$ toward the left, causing them by their surfaces $s$ to ride up upon the pins $r$, and so move the shoulders $o$ outwardly from the axis of rotation $a$, which is concentric with the shafts S and $g$. With the parts in this position, the neck or extension of the glass article is introduced, the bead or ridge B being brought against the member *p*, which yields toward the right, and the lever *y* may then be actuated or released to cause or allow the shaft *g* to return toward the right, whereupon the fingers *j* will be forced inwardly, causing the shoulders *o* to engage the bead B. Preferably also the shoulder of the article adjacent the junction of the article itself and its extension comes into contact with the mouth of the chuck C, which may be provided with a pad $a^1$, of rubber or other suitable material.

The article is therefore supported with its axis coincident with the axis of rotation of the chuck or holder structure, this coincidence resulting from the fact that the extension, or one or more parts thereof, is or are truly co-axial with the article or tumbler T itself.

The article and its neck or extension are preferably annealed after their initial production, as in the mold M or otherwise, and before introduction into the holding or chuck structure.

While held in the chuck structure, the latter is rotated at suitable speed, leaving the entire or substantially entire article T projecting free for allowance of any operation thereon. The chuck may be rotated continuously, to cause decorative bands to be cut on the article, as shown in Fig. 6, or may be rotated intermittently to permit the cutting of a series of circumferentially spaced indentations.

While so held or held and rotated, the article T may be decorated, as by cutting or grinding in well known way, as by a cutter or grinding wheel W, which may take various different positions according to the design to be cut, such cutter or grinding wheel effecting the ornamentation or decoration one example of which is indicated in Fig. 6.

After the article has been decorated or otherwise suitably operated upon, it is severed from the extension or neck, as by cutter wheel positioned as indicated at V, the cut preferably being continued entirely through the glass, thereby severing the article T and leaving in the chuck the neck or extension E.

This mode of severing the article is of advantage, particularly over the method characterized by scratching or cutting partially through the glass and thereafter applying heat, as by flame or otherwise, to cause completion of severance by cracking, which generally necessitates subsequent application of heat, as by flame, to the severed edge of the article.

By again actuating the lever *y*, the neck or extension will be released by the chuck structure, from which it is then removed, and the neck or extension integral with another article is introduced to the position indicated in Fig. 1.

While in Figs. 1 and 5 I have indicated a simple form of tumbler, it will be understood that the article may be of any suitable or desirable shape. Another example is indicated in Fig. 7. In this instance the article is one of stem ware, having a stem $b^1$ and a main or cup portion T having the integral neck E, by which it is held and rotated with its axis *a* co-incident with the axis of rotation.

In accordance with my method, the article itself is not directly held while in rotation for cutting or other operation, but is held and rotated by an integral extension having suitable holder-engaging surface or surfaces substantially accurately co-axial with the axis of the article itself, whereby the article when rotated runs true.

By this method it is unnecessary to grasp or hold the article itself for rotation thereof, as by means extending into the interior thereof, or by other means.

What I claim is:

1. The method of producing a receptacle of glass, which consists in forming said receptacle of glass with an integral extension having a shoulder and at a distance therefrom longitudinally a ridge both having axes coincident with the axis of said receptacle, holding and rotating said extension by said shoulder and ridge, and operating upon said receptacle while integral with and rotated by said extension.

2. The method of producing a receptacle of glass, which consists in forming a receptacle with an integral extension having portions of different diameters concentric with the axis of said receptacle and spaced from each other longitudinally of said axis, supporting said receptacle by holding said extension at said portions of different diameters, rotating said receptacle by rotating said extension, and operating upon the receptacle while so held.

3. The method of producing an article of glass, which consists in forming said article with an integral extension provided with concentric ridge and shoulder portions, grasping the ridge portion and drawing the shoulder portion into engagement with a concentrically disposed support, holding and rotating the article by said concentric portions, and operating upon the article while so held.

4. The method of producing an article of glass, which consists in forming said article with an integral extension provided with a shoulder portion, exerting tension on said extension in a direction longitudinally thereof for holding said shoulder portion against an abutment, rotating said article, and operating upon the article while in rotation.

5. The method of producing a receptacle of glass, which consists in forming said receptacle with an integral extension having a shoulder and at a distance therefrom longitudinally a ridge both having axes coincident with the axis of said receptacle, holding and rotating said extension by said shoulder and ridge, grinding said receptacle while integral with the said extension, and thereafter while in rotation severing said receptacle and extension from each other.

6. The method of producing an article of glass, which consists in forming said article with an integral extension provided with a shoulder portion, exerting tension on said extension in a direction longitudinally thereof for holding said shoulder portion against an abutment, and operating upon the article while so held.

7. The method of producing an article of glass, which consists in forming said article with an integral extension provided with a shoulder portion, exerting tension on said extension in a direction longitudinally thereof for holding said shoulder portion against an abutment, decorating said article by grinding while so held, and thereafter while rotating severing said article from said extension.

In testimony whereof I have hereunto affixed my signature this 31st day of March, 1921.

JOHN A. MILLIKEN.